United States Patent [19]

Goodwin, III

[11] Patent Number: 5,595,000
[45] Date of Patent: Jan. 21, 1997

[54] NO-VENT DRY KILN

[75] Inventor: Tom E. Goodwin, III, Green Cove Springs, Fla.

[73] Assignee: U.S. Natural Resources, Inc., Vancouver, Wash.

[21] Appl. No.: 338,393

[22] Filed: Jan. 17, 1995

[51] Int. Cl.$^6$ ........................................ F26B 3/00
[52] U.S. Cl. .................. 34/471; 34/535; 34/77; 34/212; 34/215; 34/219
[58] Field of Search ................. 34/191, 77, 471, 34/535, 212, 215, 219, 557; 62/173

[56] References Cited

U.S. PATENT DOCUMENTS

| | | | |
|---|---|---|---|
| 2,270,815 | 1/1942 | Vaughan | 34/191 |
| 2,484,527 | 10/1949 | Rhoads et al. | 34/212 |
| 3,070,896 | 1/1963 | Knudson et al. | 34/219 |
| 3,939,573 | 2/1976 | Berti | 34/471 |
| 4,182,048 | 1/1980 | Wolfe . | |
| 4,250,629 | 2/1981 | Lewis | 34/77 |
| 4,356,641 | 11/1982 | Rosenau | 34/191 |
| 4,922,624 | 5/1990 | Tharpe | 34/191 |
| 4,974,337 | 12/1990 | Tavakoli et al. | 34/471 |
| 5,123,177 | 6/1992 | Koetter et al. | 34/191 |
| 5,228,209 | 7/1993 | Brunner | 34/77 |
| 5,269,151 | 12/1993 | Dinh . | |
| 5,325,604 | 7/1994 | Little | 34/557 |
| 5,333,470 | 8/1994 | Dinh . | |

FOREIGN PATENT DOCUMENTS

| | | |
|---|---|---|
| 170648 | 2/1986 | European Pat. Off. . |
| 225493 | 7/1985 | Germany . |

Primary Examiner—John M. Sollecito
Assistant Examiner—Steve Gravini
Attorney, Agent, or Firm—Robert L. Harrington

[57] ABSTRACT

A no-vent dry kiln for drying wood products such as lumber. The kiln has a dehumidification unit to remove excess moisture from the air utilized as the drying media. The dry bulb and wet bulb temperatures of the air within the kiln enclosure are precisely monitored to control the conditions of the atmosphere within the kiln enclosure. The kiln has a dehumidification unit to remove excess moisture from the air and to retain the sensible heat of the air stream passing through the dehumidification unit. The air stream, under a controlled flow rate passes through a first coil which removes the sensible heat from the air stream to lower the temperature of the air stream to at or below its saturation temperature. The heat removed by the first coil is transferred to a third coil down stream. A second coil downstream from the first coil lowers the temperature of the air stream well below the dew point causing the condensing of moisture. The condensed moisture is removed by a condensate removal system. The dehumidified air then passes through the third coil where the heat previously removed by the first coil is reintroduced into the air stream, adding heat if necessary to bring the air stream up to the desired dry bulb temperature. The air stream is then admixed with the drying air within the kiln enclosure. Both the dry bulb and wet bulb temperatures of the air are precisely controlled to provide a desired drying schedule.

7 Claims, 4 Drawing Sheets

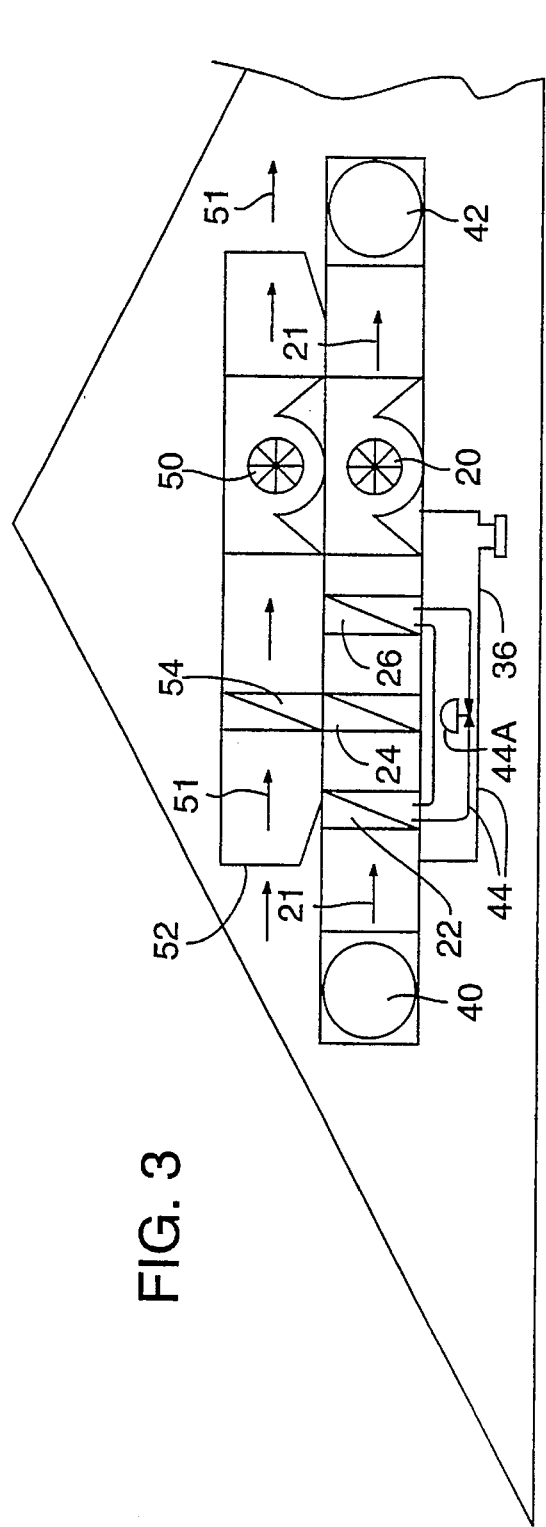
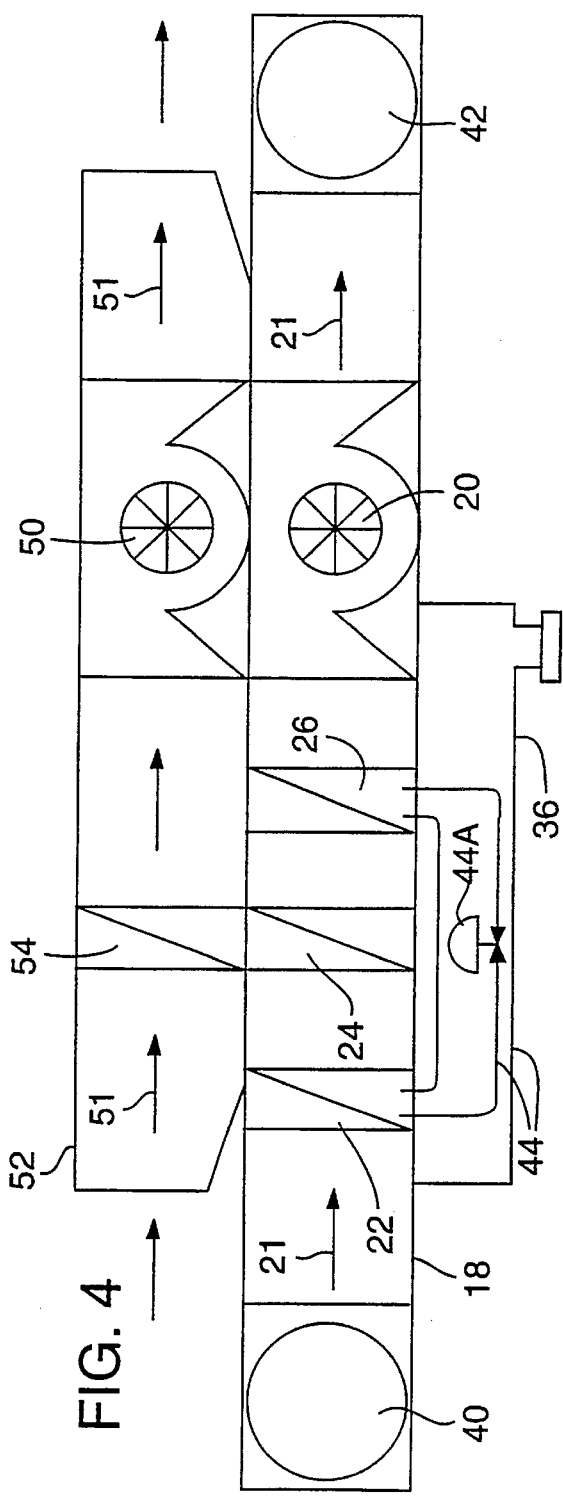

NO-VENT DRY KILN

FIELD OF THE INVENTION

This invention relates to dry kilns for drying lumber and more particularly to control systems for controlling temperature and humidity in the dry kiln without venting to the atmosphere.

BACKGROUND OF THE INVENTION

Dry kilns are used for controlled drying of green lumber, i.e., lumber that is newly cut from logs. Uncontrolled drying can result in the lumber warping and splitting. Thus, to maintain grade, the lumber is dried through a process of controlled heating. The heating process involves control over the temperature, humidity and circulation of the air in the kiln. Temperature and humidity in particular have to be monitored and changed throughout the process as the lumber transcends from a wet condition to a dry condition. Even further, the process of drying will be different for different types of lumber.

The controls and procedures for drying lumber in a dry kiln have become very sophisticated but heretofore the process has always relied on venting to the atmosphere. The air in the dry kiln becomes saturated with moisture. The outgoing moist air is vented to the atmosphere and replaced with drier air from the atmosphere which is drawn into the kiln and heated to the desired temperature.

BRIEF SUMMARY OF THE INVENTION

The present invention achieves two primary objectives. The first objective is to reduce or eliminate the venting of the moistened and often contaminated air into the atmosphere. Such venting is often objected to for environmental reasons. The second objective is to reduce the energy requirement for maintaining the temperature of the air inside the kiln. The energy loss in venting hot air to the atmosphere and then having to heat the incoming ambient air is expensive and adds undesired costs to the dry kiln operation. Still further is the achievement of predictability. Atmospheric air is always an unknown. Atmospheric conditions including wind, rain and temperature (sometimes below freezing) will have varying affects on humidity and temperature levels of incoming air. In some weather conditions the temperature and/or humidity may be such that it cannot be used and the kiln has to be shut down.

The present invention involves dehumidification of the air inside the dry kiln and continuously recirculating it back through the dry kiln. In the preferred embodiment, humid air is drawn from within the kiln through a duct system that includes a first cooling chamber having a cooling coil that cools the air to near or below dew point. The sensible heat drawn from the air in the first chamber is transferred to a third chamber. The saturated air moves through a second chamber where it is further cooled to condense the moist air to liquid which is collected and drained from the chamber for disposal. The air is then passed through the third chamber where heat from the first chamber is transferred back to the new cooled dry air and the air is then re-introduced into the kiln.

Additional coil combinations may be employed to achieve condensation, which includes a single coil as well as multiple coil configurations. The selection of the coil combination (or combinations) is dependent in part on the geographical location, the wood species to be dried and the kiln operating parameters.

Several options are available for achieving the desired heat transfer which will be explained in greater detail in the following detailed description and accompanying drawings.

BRIEF DESCRIPTION OF THE DRAWINGS

FIG. 3 is an alternate embodiment of the dehumidification unit of FIG. 2;

FIG. 4 is another view of the dehumidification unit of FIG. 3;

DESCRIPTION OF THE PREFERRED EMBODIMENT

Figure 1:
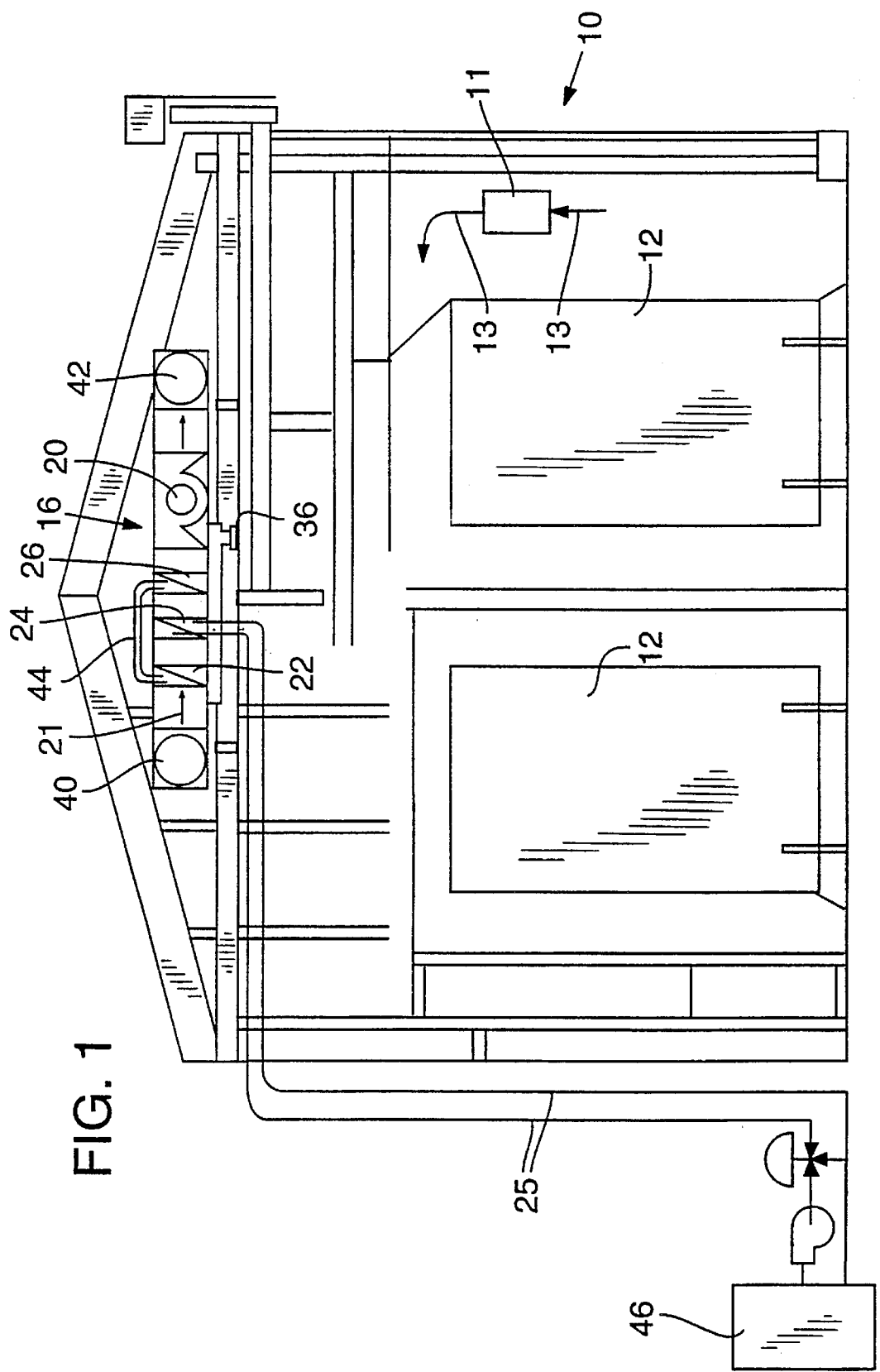
FIG. 1 is a schematic illustration of a no-vent kiln of the present invention.

FIG. 1 is a schematic illustration of a no-vent dry kiln 10 of the present invention arranged for drying lumber products. The kiln 10 is an enclosed structure and in this embodiment is a double track unit that is arranged to receive loads 12 of stacked wood products, such as lumber. The kiln 10 has apparatus to monitor and adjust the conditions of the atmosphere within the kiln 10 in particular the dry bulb temperature and the wet bulb temperature of the air that is circulated around and through the lumber loads 12. The kiln 10 controls the atmosphere within the kiln and is independent of atmospheric conditions outside of the kiln.

Both the dry bulb temperature and the wet bulb temperature of the air within the kiln are precisely controlled in order to provide the optimum drying schedule for the lumber to be dried. The dry bulb temperature of the air is controlled by increasing or decreasing the heat input. The wet bulb temperature of the air is controlled by either adding moisture to the air as by a live steam jet or removing moisture from the air. The present invention is directed to the precise control of removing moisture from the air to control the wet bulb temperature of the air utilized to dry the lumber.

The dry kiln 10 is arranged to exhaust air from the enclosure of the kiln 10 into the dehumidification unit 16, dehumidify the exhausted air, heat the air (if required) and return the air to be recirculated through the kiln. For drawing clarity, only the apparatus necessary for an understanding of the invention is illustrated.

Figure 6:
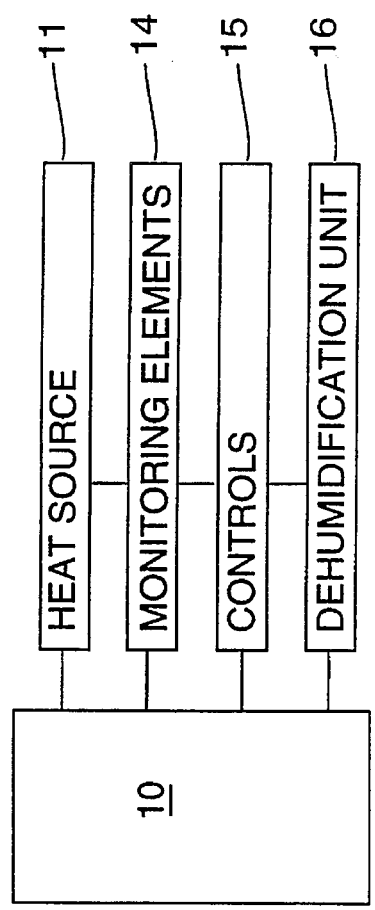
FIG. 6 is a block diagram illustrating the basic components of the kiln of FIG. 1.

The block diagram of FIG. 6 illustrates the basic apparatus of the kiln 10. A heat source 11 is provided to heat and circulate the air within the enclosure of the kiln 10 illustrated as a box 11 with circulating arrows 13 in FIG. 1 that is utilized as the drying media and will provide additional heat, if required, to the air stream flowing through the dehumidification unit 16. Monitoring elements 14 are provided to monitor the temperature, humidity and air flow rates within the kiln 10 and within the dehumidification unit 16. The monitoring elements will in particular monitor both the dry bulb temperature and the wet bulb temperatures within the kiln 10 enclosure and the dehumidification unit 16. Additionally the monitoring units will monitor the temperatures of the coils of the dehumidification unit 16 and in an alternate embodiment will monitor the temperature of and the flow rate of the outside air flowing through the air heat exchanger. Controls 15 are provided to control the operation of the apparatus of the kiln 10 in conjunction with the monitoring elements 14.

Figure 2:
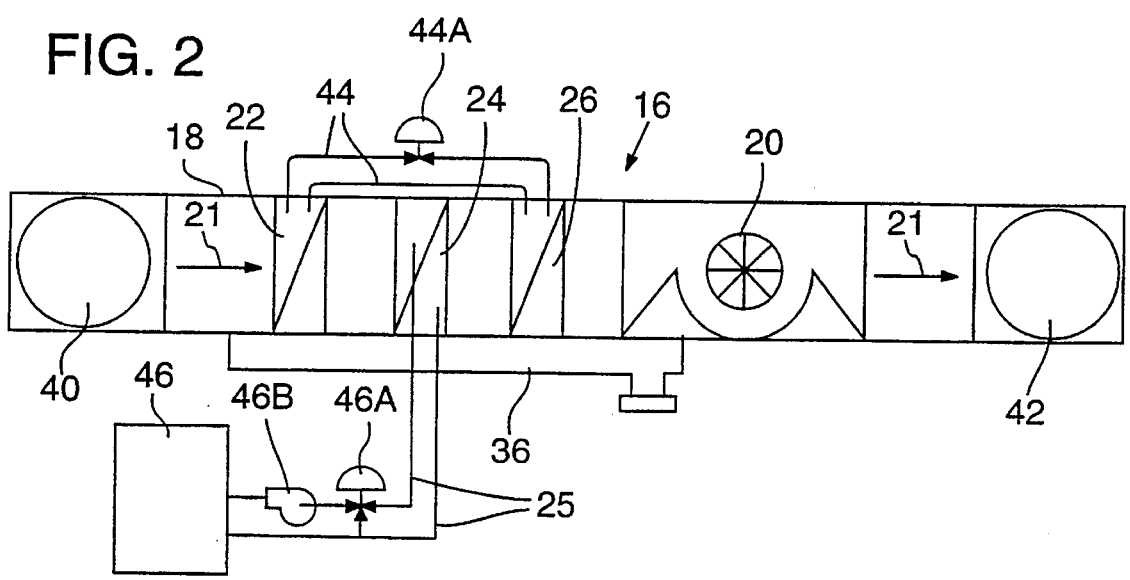
FIG. 2 is a view of a dehumidification unit of the kiln of FIG. 1.
Figure 5:
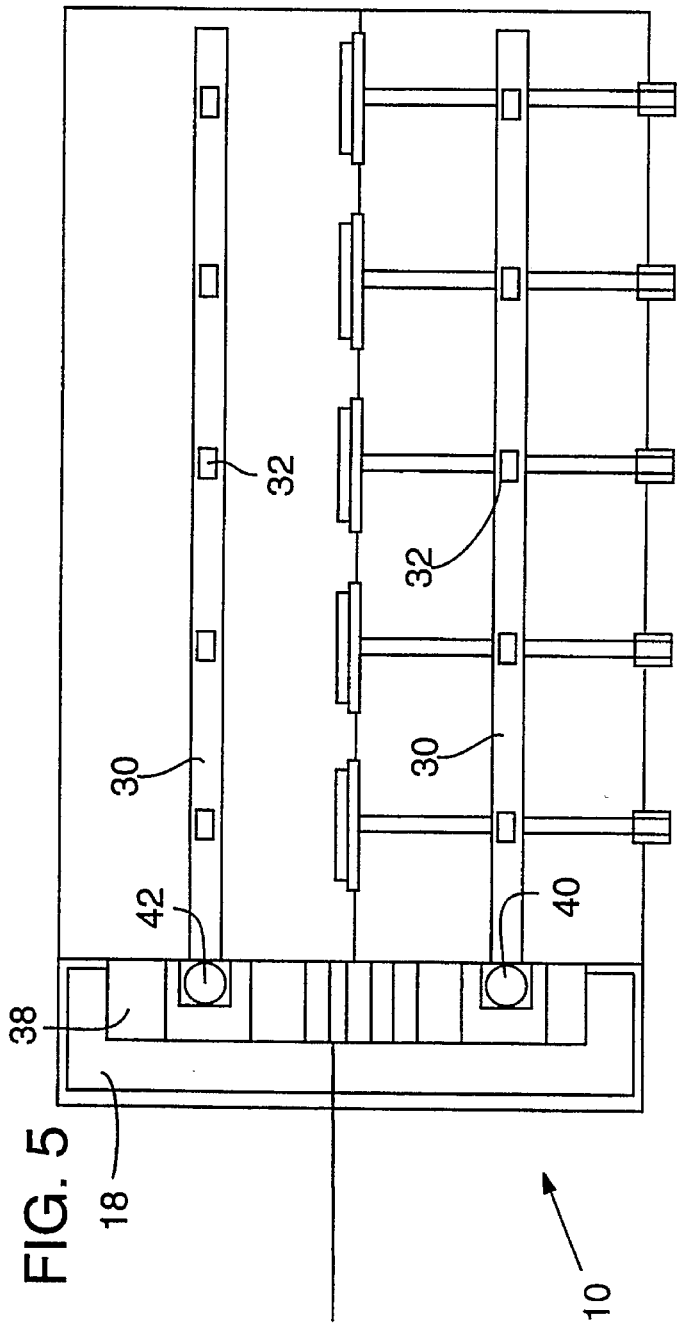
FIG. 5 is a plan view of the kiln of FIG. 1.

One embodiment of the dehumidification unit 16 is further illustrated in FIG. 2 in conjunction with FIG. 5. The dehumidification unit 16 has a common cabinet 18 in which an assembly of a fan 20 (or fans), coils 22, 24, 26 are housed and are connected to a duct work 30 (see FIG. 5) sized for a specific volumetric flow. The coils 22, 24 and 26 in effect define chambers within the cabinet 18 through which an air stream will pass. The duct work 30 includes air distribution diffusers and grilles 32. The cabinet 18 also houses a condensate removal system 36 and the power equipment and control compartment 38.

The fan 20 (or fans) is a variable speed, reversible flow type that is sized for the specific kiln drying capacity of the kiln 10. The fan 20, when in operation will draw air from the enclosure of the kiln 10 through the exhaust duct 40 to pass the air through the coils 22, 24, 26 and reintroduce the air into the kiln enclosure through the intake duct 42 as indicated by the directional arrows 21. The fan 20 is operated when it is desired to remove moisture from the heated moisture laden air of the kiln 10 to precisely control the wet bulb temperature.

Coil 22, as the air is drawn through it will remove the sensible heat from the air. Coil 22 thus reduces the dry bulb temperature of the air to at or below the saturation temperature. The sensible heat removed by coil 22 is transferred to coil 26 by a known heat exchanger, indicated by numeral 44 such as a split or wrap around heat pipe or a pumped heat transfer fluid. The sensible heat transferred to coil 26 will be reintroduced to the air stream as the air passes through coil 26.

The cooled saturated air leaving coil 22 passes through coil 24 where it is further cooled to well below the dew point which causes a condensation of moisture onto coil 24. The temperature of coil 24 is controlled by connection through conduit 25 to known apparatus (designated by numeral 46) such as a chilled water coil or a water coil in conjunction with an evaporative cooling tower. Another apparatus to control the temperature of coil 24 is an air to air coil utilizing an outside air stream which is later described and illustrated. The moisture condensed on coil 24 is removed from the kiln 10 by the condensate removal system 36.

The cooled dehumidified air leaving coil 24 then passes through coil 26 where the sensible heat removed at coil 22 is reintroduced into the air stream by the transfer of heat from coil 26 to the air stream. Additional heat is applied, if required, to elevate the dehumidified air to the desired dry bulb temperature. The air exits the cabinet 18 through intake duct 42 and reenters the enclosure of the kiln 10 through the duct work 30 to be admixed with the air within the kiln 10.

The wet bulb temperature of the air stream exiting the dehumidification system 16 is controlled by varying the speed of fan 20 in conjunction with the temperature of coil 24. Varying the speed of the fan 20 will vary the volume of air that is drawn into and through the dehumidification unit 16 and controlling the temperature of coil 24 in conjunction with the flow rate will determine the amount of moisture removed from the air stream. The dry bulb temperature and the wet bulb temperature of the air stream exiting the dehumidification unit 16 may thus be precisely controlled.

FIGS. 3 and 4 illustrate an air to air coil utilizing an outside air stream to control the condensing temperature of coil 24. Fan 20 provides circulation of the air stream from the kiln atmosphere through the dehumidification unit and back to the kiln atmosphere. Fan 50 is a reversible flow, variable speed air handling unit and is utilized to draw outside air into the duct work 52 and through the coil 54 (chamber) and discharge the air to the outside atmosphere as indicated by the directional arrows 51. Coil 54 is coupled to coil 24 by a heat exchanging media and fan 50 provides cooling air flow through coil 54 which causes heat to transfer from coil 24 to coil 54. As previously mentioned coil 22 removes the sensible heat from the air stream in the dehumidification unit 16 generated by fan 20 to lower the air stream to at or below the saturation temperature. The sensible heat removed by coil 22 is transferred to coil 26. Coil 24, in its cooled condition will lower the kiln air stream to a temperature well below its dew point causing moisture in the air to condense on the coil 24. The condensed moisture is removed by the condensate removal system 36. The condensing rate is controlled by controlling the rate of fan 50 which regulates the flow of outside air through coil 54 and thus the rate of heat transfer from coil 24 to coil 54. The fans 20 and 50 controlled in conjunction with each other will control the moisture extraction rate which provides a precise control of the kiln atmosphere resulting in a precise control of the wood drying process.

The fans 20 and 50 illustrated in the figures and with reference to FIG. 4 are variable speed, reversible flow type and therefore the directional flow of the air may be opposite to that illustrated in the figures. The air flowing in the opposite direction to arrow 21 in the dehumidification unit 16 will therefore have the sensible heat removed from the air at coil 26 and will be reintroduced at coil 22. Coil 24 will still lower the temperature of the air well below the dew point causing the moisture to condense from the air stream. Similarly the direction of the air flow may be opposite to that as indicated by the directional arrows 51 in the alternate embodiment of the air to air heat exchanger as illustrated in FIGS. 3 and 4.

Referring to FIG. 2, the valve 44A of the heat exchanger 44 may be utilized to regulate the flow of sensible heat and may also be utilized to regulate the moisture removal rate in conjunction with and in addition to regulating (varying) the speed of the fan 20. In the embodiment of FIG. 3. the valve 44A may be utilized to regulate the moisture removal rate in conjunction with and in addition to regulating (varying) the speed of the fans 20 and 50.

The apparatus 46 (and coil 24) have valves 46A and 46B which are utilized to regulate the flow of coolant to coil 24 to control the temperature of the coil 24 and thus regulate the amount of moisture removed from the air stream passing through the coil 24. The control of the flow rate of the air stream, the control of the flow rate of the sensible heat and the control of the temperature of the coil 24 provides for a precise control of the atmosphere within the kiln 10.

The kiln 10 of the present invention operates independent of the external atmosphere. Air is neither exhausted to the atmosphere nor is "make up air" added to the kiln's internal atmosphere to control either the dry bulb or wet bulb temperatures. The precise control over the extraction of moisture in conjunction with known parameters of the internal kiln atmosphere provides precise control of both the dry and wet bulb temperatures that were heretofore not attainable.

Those skilled in the art will recognize that modifications and variations may be made without departing from the true spirit and scope of the invention. The invention is therefore not to be limited to the embodiments described and illustrated but is to be determined from the appended claims.

I claim:

1. A dry kiln comprising:

an enclosed structure for containing a quantity of lumber to be dried;

a heat source for heating the air within the structure for drying the lumber;

monitoring elements monitoring the temperature and the humidity of the air within the structure;

a dehumidifying system contained in the structure including a chamber for receiving moisture laden air from the structure, an air moving element for moving air from the structure through the dehumidifying system and back into the structure, a cooling element in the chamber to condense the moisture to liquid form, a drain element to drain the liquid from the structure;

controls responsive to the monitoring elements for controlling the heat source and dehumidifying system in accordance with a determined program for drying the lumber; and said dry kiln devoid of any venting during operation to and from the atmosphere and said cooling element provided by a heat exchanger that circulates a medium from exterior of the kiln whereat the medium is cooled, to the chamber whereat the medium is heated.

2. A dry kiln as defined in claim 1 wherein the dehumidifying system includes a first chamber for cooling the air to near dew point, a second chamber for cooling the air to below dew point causing condensation of the moisture, and a third chamber for receiving the dehumidified air and for reheating the air prior to discharge back into the structure.

3. A dry kiln as defined in claim 2 wherein the dehumidifying system includes a cooling element that is a heat exchanger that draws heat from the air in the first chamber and emits heat to the air in the third chamber.

4. A dry kiln as defined in claim 3 wherein the second chamber is coupled to a fourth chamber for cooling the second chamber, said fourth chamber arranged to transfer heat removed from said second chamber to air outside said enclosure.

5. A method of drying lumber under controlled conditions in a dry kiln which comprises:

placing a quantity of stacked wet lumber in an enclosed structure;

circulating heated air within the structure and through the stacked wet lumber;

monitoring the humidity level indicating moisture content of the circulating heated air;

in response to the presence of a pre-determined humidity level of the air, dehumidifying the air using a heat exchanger extending from a dehumidifying chamber to exterior of the dry kiln whereat a media flowing through the heat exchanger is cooled and circulated to the chamber and thereby condensing moisture from the air passing through the chamber to liquid form and lowering the humidity level of the circulating air without venting to the atmosphere; and draining off the liquid from the dehumidifying chamber to be removed from the structure while continuing the circulation of the heated air confined in the structure.

6. A method as defined in claim 5 wherein the dehumidifying step includes a first sub-step of extracting heat from the heated air, a second sub-step of extracting heat from the heated air to the dew point level or below and thereby extract liquid from the air, and a third sub-step of transferring the extracted heat from the first sub-step to the air following the second sub-step.

7. A method as defined in claim 5 wherein the liquid is drained off for controlled disposal.

* * * * *